(12) United States Patent
Sako et al.

(10) Patent No.: US 10,962,808 B2
(45) Date of Patent: Mar. 30, 2021

(54) CONTACT LENS WITH IMAGE PICKUP CONTROL

(71) Applicant: SONY CORPORATION, Tokyo (JP)

(72) Inventors: Yoichiro Sako, Tokyo (JP); Masanori Iwasaki, Kanagawa (JP); Kazunori Hayashi, Tokyo (JP); Takayasu Kon, Tokyo (JP); Takatoshi Nakamura, Tokyo (JP); Tomoya Onuma, Shizuoki (JP); Akira Tange, Tokyo (JP)

(73) Assignee: SONY CORPORATION, Tokyo (JP)

(*) Notice: Subject to any disclaimer, the term of this patent is extended or adjusted under 35 U.S.C. 154(b) by 469 days.

(21) Appl. No.: 14/785,249

(22) PCT Filed: Feb. 12, 2014

(86) PCT No.: PCT/JP2014/053217
§ 371 (c)(1),
(2) Date: Oct. 16, 2015

(87) PCT Pub. No.: WO2014/178212
PCT Pub. Date: Nov. 6, 2014

(65) Prior Publication Data
US 2016/0097940 A1    Apr. 7, 2016

(30) Foreign Application Priority Data

May 2, 2013    (JP) .............................. JP2013-096972

(51) Int. Cl.
*G02C 11/00*    (2006.01)
*G02C 7/04*    (2006.01)
(Continued)

(52) U.S. Cl.
CPC ................. *G02C 11/10* (2013.01); *G02C 7/04* (2013.01); *G02C 7/101* (2013.01); *G03B 17/48* (2013.01);
(Continued)

(58) Field of Classification Search
CPC .......... G02C 7/023; G02C 7/04; G02C 7/046; G02C 7/08; G02C 7/081; G02C 7/083; G02C 7/10; G02C 7/101; G02C 7/102; G02C 11/10; G02B 7/023; G02B 7/08; G02B 7/102; G02B 2027/0116; G02B 2027/0138; G02B 2027/0178; G02B 2027/0187; G02B 27/0093; G02B 27/017; G02B 27/08; G03B 11/00; G03B 17/48; A61B 3/113; A61B 5/6821;
(Continued)

(56) References Cited

U.S. PATENT DOCUMENTS 9,500,884 B2 * 11/2016 Egan ........................ G02C 7/04
2003/0021601 A1 * 1/2003 Goldstein .............. G03B 17/00
396/263
(Continued)

FOREIGN PATENT DOCUMENTS

JP    2012139562 A  *  7/2012

*Primary Examiner* — James C. Jones
(74) *Attorney, Agent, or Firm* — Chip Law Group

(57) ABSTRACT

Provided is a contact lens including: a lens unit configured to be worn on an eyeball; an image pickup unit configured to capture an image of a subject, the image pickup unit being provided in the lens unit; and an image pickup control unit configured to control the image pickup unit.

13 Claims, 8 Drawing Sheets

(51) Int. Cl.
 *G02C 7/10* (2006.01)
 *G03B 17/48* (2021.01)
 *H04N 5/225* (2006.01)
 *H04N 5/232* (2006.01)

(52) U.S. Cl.
 CPC ......... *H04N 5/2251* (2013.01); *H04N 5/2252* (2013.01); *H04N 5/2257* (2013.01); *H04N 5/23293* (2013.01)

(58) Field of Classification Search
 CPC .... A61B 2560/0242; A61B 2562/0219; G06F 3/011; G06F 3/012; G06F 3/013; G06F 3/017; G06F 3/038; G06T 2207/10024; G06T 2207/20104; H04N 5/225; H04N 5/2253; H04N 5/2254; H04N 5/2257; H04N 5/232; H04N 5/23219; H04N 5/23222; H04N 5/23293; H04N 5/335; H04N 9/07; H04N 13/0207; H04N 21/4223; H04N 2201/0084; H04N 5/2251; H04N 5/2252; H04M 2250/12; H04M 2250/52
 See application file for complete search history.

(56) References Cited

U.S. PATENT DOCUMENTS

2006/0227067 A1* 10/2006 Iwasaki ............... G02B 27/017
 345/8
2014/0243971 A1* 8/2014 Pugh ........................ G02C 7/04
 623/6.22

* cited by examiner

CONTACT LENS WITH IMAGE PICKUP CONTROL

TECHNICAL FIELD

The present disclosure relates to a contact lens and a storage medium.

BACKGROUND ART

In recent years, contact lenses that are directly worn on eyeballs are practically used as visual sensation correction devices. Further, contact lenses are used not only for correcting visual sensation but also for changing appearance of eyes, and, in this case, lenses are colored.

Many colored contact lenses (color contact lens) have been used in recent years, and, usually, a user actually tries on a color contact lens to check appearance of his/her eye and determines which color of a lens suits the user. Herein, the following Patent Literature 1 discloses a system that simulates appearance of a user wearing a color contact lens and presents the simulated appearance in order to reduce economic and material waste of contact lenses for trial fitting.

Further, recently, the following Patent Literature 2 has disclosed an image display device using contact lenses. Patent Literature 2 proposes a thin image display device in which a display unit and a lens array unit are integrally provided on a curved surface, the thin image display device being shaped to be fully wearable on an eye such as a contact lens.

CITATION LIST

Patent Literature

Patent Literature 1: JP2010-211210A
Patent Literature 2: JP2006-292883A

SUMMARY OF INVENTION

Technical Problem

However, Patent Literatures 1 and 2 do not mention a configuration in which a contact lens has an image pickup function.

In view of this, the present disclosure provides a contact lens and a storage medium, each of which is new and improved and is capable of controlling an image pickup unit provided in the contact lens.

Solution to Problem

According to the present disclosure, there is provided a contact lens including: a lens unit configured to be worn on an eyeball; an image pickup unit configured to capture an image of a subject, the image pickup unit being provided in the lens unit; and an image pickup control unit configured to control the image pickup unit.

According to the present disclosure, there is provided a storage medium having a program stored therein, the program causing a computer to function as: an image pickup unit configured to capture an image of a subject, the image pickup unit being provided in a lens unit of a contact lens configured to be worn on an eyeball; and an image pickup control unit configured to control the image pickup unit.

Advantageous Effects of Invention

As described above, according to the present disclosure, it is possible to control an image pickup unit provided in a contact lens.

DESCRIPTION OF EMBODIMENTS

Figure 1:
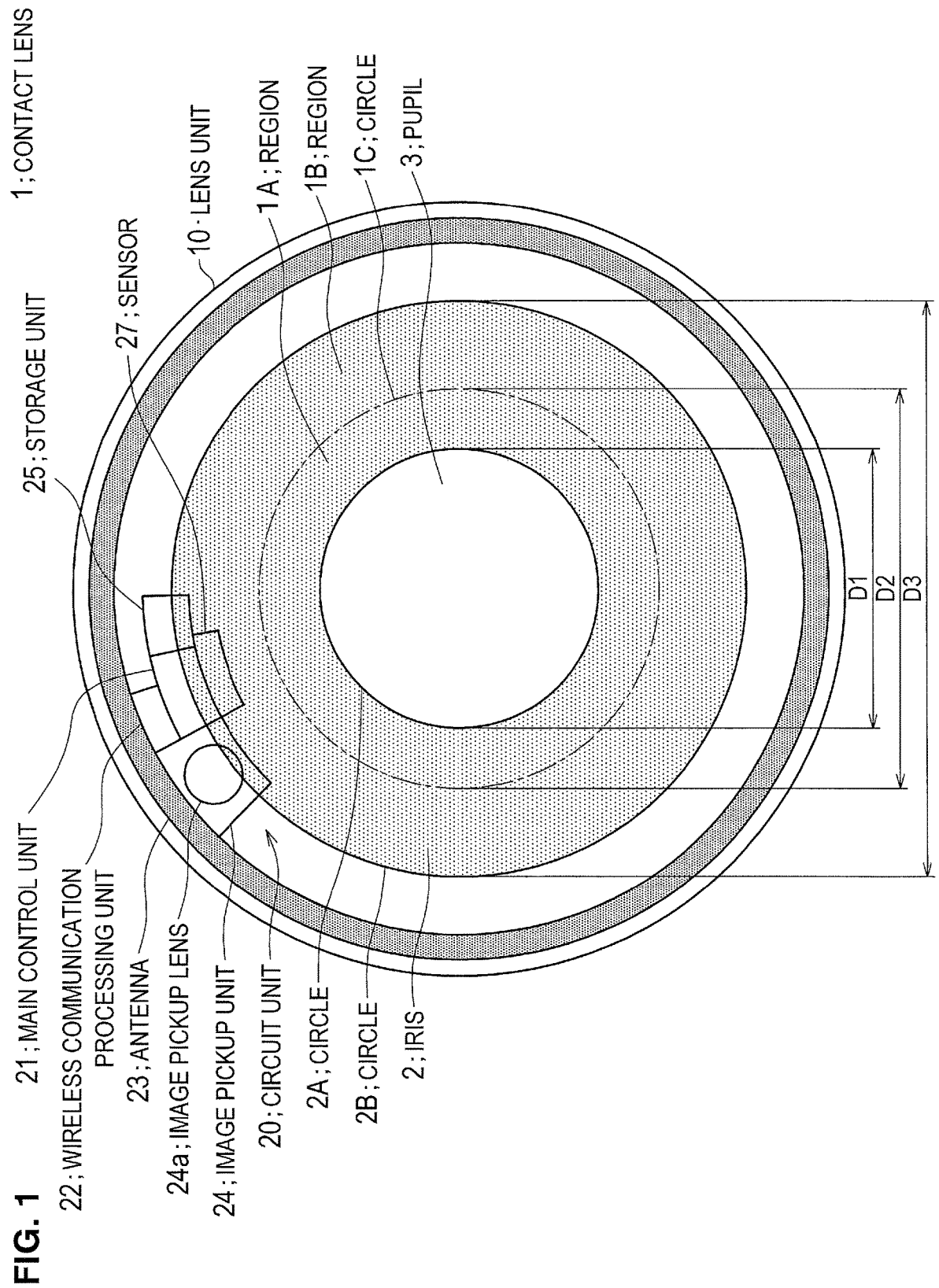
FIG. 1 is a planar view illustrating an example of an appearance configuration of a contact lens according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.

1. Outline of contact lens according to embodiment of present disclosure
   1-1. Appearance configuration
   1-2. Functional configuration
2. Operation processing
   2-1. First image pickup control
   2-2. Second image pickup control
   2-3. First image pickup/display control
   2-4. Second image pickup/display control
   2-5. Third image pickup/display control
3. Conclusion

1. OUTLINE OF CONTACT LENS ACCORDING TO EMBODIMENT OF PRESENT DISCLOSURE

An outline of a contact lens 1 according to an embodiment of the present disclosure will be described. The contact lens 1 according to this embodiment includes a lens unit 10 (see FIG. 1) having a curved-surface shape and can be fully worn on an eye (eyeball) and be removed therefrom. A circuit unit 20 (see FIG. 1) and a display unit 26 (see FIG. 2) are provided in the lens unit 10. A smooth portion made of transparent synthetic resin or the like is formed on an external side of the circuit unit 20 and the display unit 26 provided in the lens unit 10 (opposite direction of an eyeball contact surface of the lens unit 10). With this, when the user wears the contact lens 1 on his/her eye, an eyelid of the user can be smoothly moved thereon.

(Background)

As described above, in recent years, more and more users wear prescription contact lenses and color contact lenses in order to correct visual sensation and change appearance of eyes. Further, high functionalization of such contact lenses for daily use is also proposed.

For example, Patent Literature 2 proposes an image display device in which a display unit and a lens array unit are integrally provided on a curved surface, the image display device being formed to be worn on an eye like a contact lens.

However, Patent Literature 2 does not mention a configuration in which a contact lens has an image pickup function.

In view of this, a high-function contact lens according to each embodiment of the present disclosure has been made in consideration of the above circumstances. The contact lens according to each embodiment of the present disclosure has an image pickup function and performs predetermined image pickup control in accordance with blinking or the like of a user. This makes it possible to make an intelligent contact lens, thereby remarkably improving usability.

A configuration of such a contact lens according to this embodiment will be specifically described below with reference to FIG. 1 to FIG. 3.

<1-1. Appearance Configuration>

FIG. 1 is a planar view illustrating an example of an appearance configuration of the contact lens 1 according to an embodiment of the present disclosure. As illustrated in FIG. 1, the contact lens 1 according to this embodiment includes the lens unit 10 worn on the eyeball and is divided into two regions, i.e., a region 1A on an inner side of a circle 1C and a region 1B on an outer side thereof, seen from the front of the eyeball. A diameter D2 of the circle 1C is substantially equal to or larger than a maximum diameter D1 of an inner circle 2A of an iris 2 of a human eye. The display unit 26 that displays an image is provided in at least the region 1A as described below with reference to FIG. 2.

Figure 3:
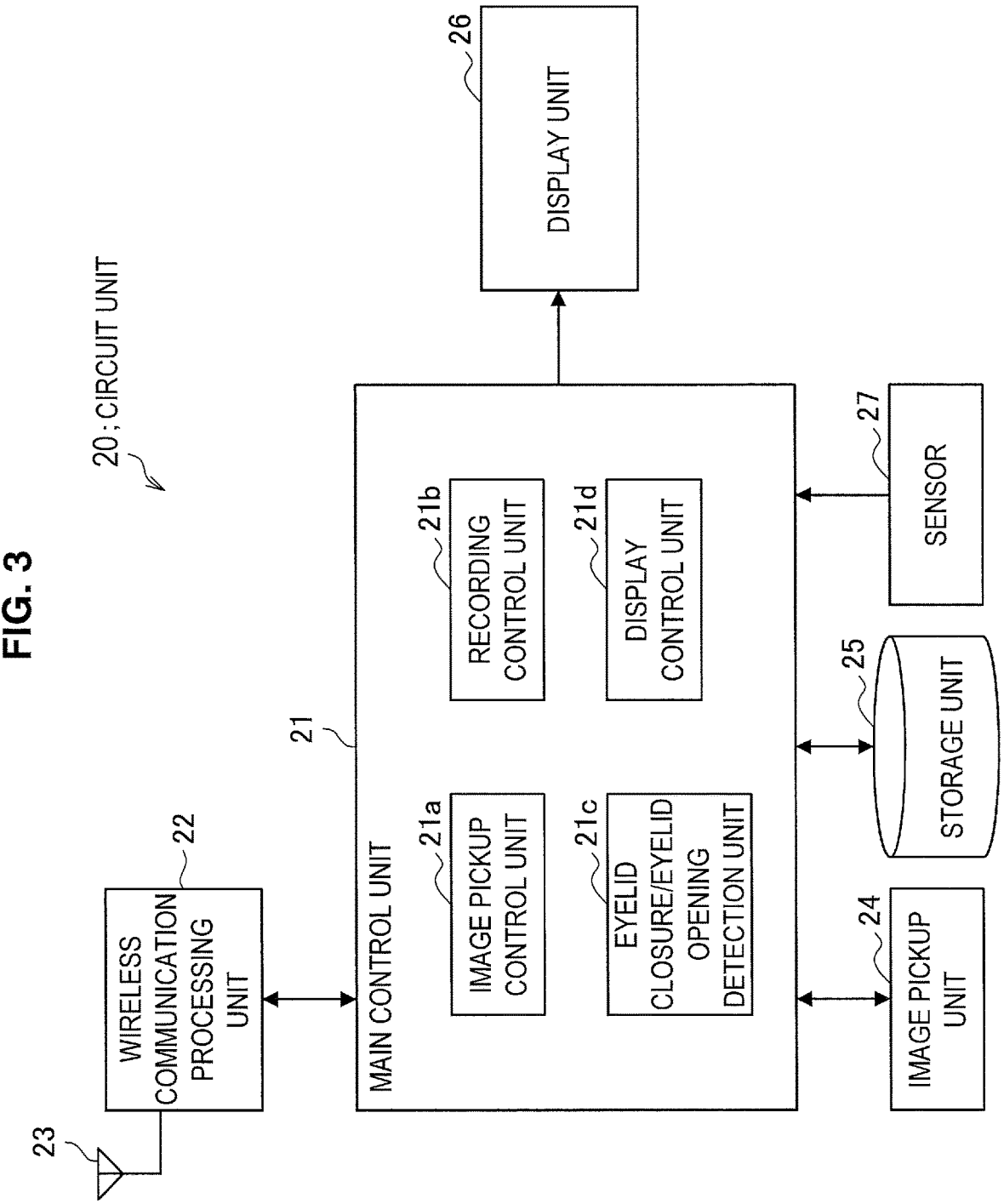
FIG. 3 is block diagram showing an example of a functional configuration of a contact lens according to this embodiment.

The circuit unit 20, which will be described below with reference to FIG. 3, is provided in the region 1B on the outer side of the circle 1C. The circuit unit 20 includes a main control unit 21, a wireless communication processing unit 22, an antenna 23, an image pickup unit 24 including an image pickup lens 24a, a storage unit 25, and a sensor 27. The circuit unit 20 is provided in the region 1B that is an outer circumference of the display unit 26 so as not to obstruct image display using the display unit 26.

(Main Control Unit 21)

The main control unit 21 includes, for example, a microcomputer (microchip, IC chip) including a central processing unit (CPU), a read only memory (ROM), and a random access memory (RAM) and controls each configuration of the circuit unit 20. For example, the main control unit 21 controls the image pickup unit 24 and records a captured image in the storage unit 25 (storage medium). Further, the main control unit 21 supplies an image signal to the display unit 26 and performs display control. A specific configuration of the main control unit 21 according to this embodiment will be described below with reference to FIG. 3.

(Wireless Communication Processing Unit 22 and Antenna 23)

The antenna 23 is wirelessly connected to an external device and has a function of transmitting and receiving data and a function of supplying and receiving electric power. The external device is, for example, a smartphone, a tablet terminal, a personal computer (PC), or the like, which exists in the vicinity of the contact lens 1. Supply and reception of electric power can be achieved by, for example, an electromagnetic induction method, a radio wave method, or an electromagnetic field resonance method.

The wireless communication processing unit 22 has a function of performing various kinds of signal processing with respect to data transmitted and received by the antenna 23 and a function of performing processing of supply and reception of electric power using the antenna 23. For example, the wireless communication processing unit 22 transmits a captured image stored in the storage unit 25 to an external device.

(Image Pickup Unit 24)

The image pickup unit 24 includes, for example, a lens system including the image pickup lens 24a, an aperture stop, a zoom lens, a focus lens, and the like, a drive system that causes the lens system to perform focusing operation and zooming operation, and a solid-state image pickup element array that performs photoelectric conversion with respect to image pickup light obtained in the lens system to thereby generate an image pickup signal. The solid-state image pickup element array may be realized by, for example, a charge coupled device (CCD) sensor array or a complementary metal oxide semiconductor (CMOS) sensor array.

As illustrated in FIG. 1, the image pickup lens 24a is provided so that a gaze direction of the user who wears the contact lens 1 is an image pickup direction.

The image pickup unit 24 includes an image pickup signal processing unit that performs processing with respect to a signal obtained by a solid-state image pickup element to thereby obtain an image pickup signal serving as digital data. For example, the image pickup signal processing unit may perform image stabilization for correcting blur of a captured image, the blur being caused by motion of the eyeball. The image pickup unit 24 outputs the acquired captured image (digital data) to the main control unit 21.

(Storage Unit 25)

The storage unit 25 is a part that records and plays back data by using a predetermined recording medium. The recording medium can be any one of various kinds of recording media such as a permanent memory including a flash memory, and the storage unit 25 only needs to execute recording and playback in accordance with a recording medium to be employed.

(Sensor 27)

The sensor 27 is any one of various kinds of sensors for sensing external environment (peripheral) information of the contact lens 1 and is, for example, a piezoelectric sensor (example of pressure sensor), an infrared sensor, an acceleration sensor, a gyro sensor (example of tilt sensor), or an ocular potential measurement unit. The sensor 27 outputs a sensing result to the main control unit 21.

In the above description, the configuration of the circuit unit 20 provided in the lens unit 10 of the contact lens 1 has been described. Note that the configuration of the circuit unit 20 is not limited to the example illustrated in FIG. 1 and may be, for example, a configuration that does not include the antenna 23. In this case, the circuit unit 20 wirelessly communicates with an external device via a human body. Further, the circuit unit 20 may be a configuration that includes a battery. Further, arrangement of configurations of the circuit unit 20 illustrated in FIG. 1 is merely an example, and the circuit unit 20 according to this embodiment may have arrangement that is different from the arrangement of FIG. 1.

The display unit 26 provided in the region 1A will be specifically described with reference to FIG. 2.

(Display Unit)

Figure 2:
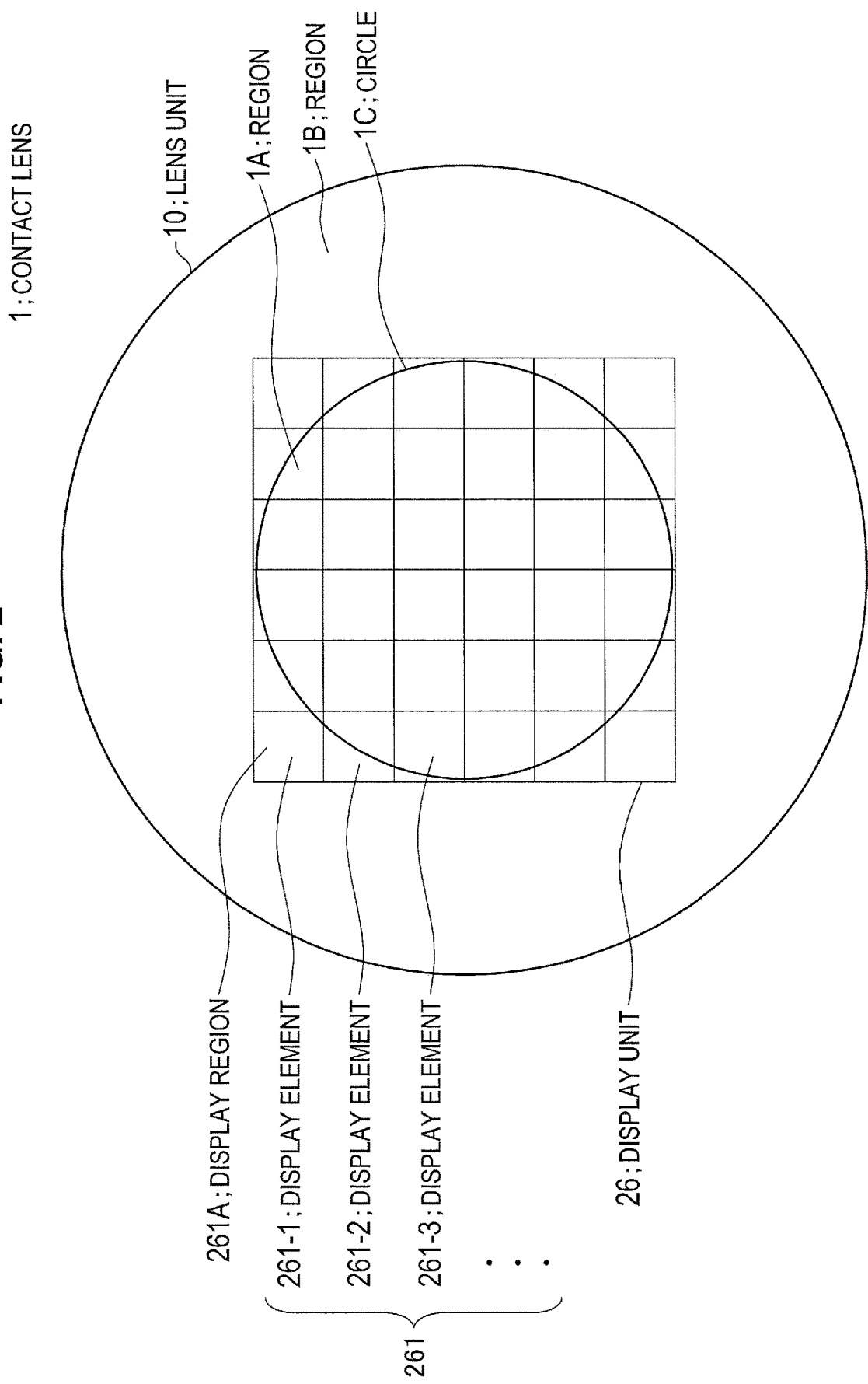
FIG. 2 illustrates a display unit according to this embodiment.

FIG. 2 illustrates the display unit 26 according to this embodiment. As illustrated in FIG. 2, a plurality of display elements 261 (In the case where display elements 261-1, 261-2, 261-3, and the like do not need to be separately described, the display elements will be simply referred to as "display elements 261" in the following description. The same applies to other members.) are placed in the display unit 26. Each display element 261 includes, for example, a liquid crystal display device, an organic electroluminescence (EL) display device, or a field emission display (FED) display device. In the example of FIG. 2, 6×6, i.e., 36 display elements 261 in total are placed in matrix on a curved surface (e.g., substantially spherical curved surface) corresponding to a surface of a human eye (in the case where another animal wears the contact lens 1, an eye of the animal). The display elements 261 have display regions 261A, respectively, and may display independent images, respectively, or all the display elements may display a single image.

As illustrated in FIG. 2, the display regions 261A are placed in the whole region 1A in the circle 1C. With this, the diameter D2 of the circle 1C is equal to or larger than a maximum diameter D1 of a pupil 3 (maximum diameter of the inner circle 2A of the iris 2), and therefore the display regions 261A always exist over the whole pupil 3 regardless of a value of the diameter of the inner circle 2A of the iris 2. Therefore, more light of images of the display regions 261A are securely formed on a retina of the eyeball. Note that, although the diameter D2 of the circle 1C has a value smaller than a diameter D3 of an outer circle 2B of the iris 2 in this embodiment, the diameter D2 may be larger than the diameter D3.

The display elements 261 are densely arranged with a pitch with which a single image can be recognized as a whole by a person (so as not to partially lose the image).

The display unit 26 allows external light to be transmitted therethrough when the display unit does not display an image, and therefore the user can visually recognize an image of the outside (scene of real space).

In the above description, the appearance configuration (hardware configuration) of the contact lens 1 according to this embodiment has been described in detail. Note that the configuration of the contact lens 1 according to this embodiment is not limited to the examples illustrated in FIG. 1 to FIG. 2 and may be, for example, a configuration that does not include the display unit 26. A functional configuration of the contact lens 1 will be specifically described with reference to FIG. 3.

<1-2. Functional Configuration>

FIG. 3 is block diagram showing an example of the functional configuration of the contact lens 1 according to this embodiment. As shown in FIG. 3, the contact lens 1 includes the circuit unit 20 including the main control unit 21, the wireless communication processing unit 22, the antenna 23, the image pickup unit 24, the storage unit 25, and the sensor 27, and the display unit 26. Note that the wireless communication processing unit 22, the antenna 23, the image pickup unit 24, the storage unit 25, the display unit 26, and the sensor 27 have been described with reference to FIG. 1 and FIG. 2, and therefore detailed description thereof is herein omitted.

As illustrated in FIG. 3, the main control unit 21 functions as an image pickup control unit 21a, a recording control unit 21b, an eyelid closure/eyelid opening detection unit 21c, and a display control unit 21d.

(Image Pickup Control Unit)

The image pickup control unit 21a controls operation of the image pickup unit 24. For example, the image pickup control unit 21a performs ON/OFF control of operation of the image pickup unit 24 and control (motor control) for causing the image pickup unit 24 to execute operation such as autofocus, automatic exposure adjustment, aperture stop adjustment, and zooming. Further, the image pickup control unit 21a performs control of image pickup sensitivity and signal processing in a solid-state image pickup element.

The image pickup control unit 21a according to this embodiment can acquire a through image (captured image) by successively converting image pickup light that is continuously obtained into digital data. Further, the image pickup control unit 21a can control the image pickup unit 24 so as to capture an image in the case where conscious eyelid closure is detected by the eyelid closure/eyelid opening detection unit 21c. Specific image pickup control performed by the image pickup control unit 21a will be described below with reference to FIG. 4 to FIG. 8.

The image pickup control unit 21a may perform predetermined image pickup control in accordance with a sensing result from the sensor 27. For example, in the case where the acceleration sensor (example of sensor 27) detects that (the user wearing) the contact lens 1 moves at a high speed, the image pickup control unit 21a performs control so that a shutter speed becomes high.

(Recording Control Unit)

The recording control unit 21b performs control so that a captured image captured by the image pickup unit 24 is recorded in the storage unit 25. More specifically, the recording control unit 21b records a through image acquired by the image pickup unit 24 in a buffer area of the storage unit 25 or records, in a main memory area of the storage unit 25, a captured image captured at a timing at which the eyelid closure/eyelid opening detection unit 21c detects conscious eyelid closure.

Further, the recording control unit 21b may record, in a storage medium, a detection result (eyelid closure information, eyelid opening information) detected by the eyelid closure/eyelid opening detection unit 21c in association with images consecutively captured by the image pickup unit 24 in a time direction.

Further, the recording control unit 21b may record, in a storage medium, tilt information detected by the gyro sensor (example of sensor 27) in association with captured images consecutively captured by the image pickup unit 24 in the time direction.

Such specific record control performed by the recording control unit 21b will be described below with reference to FIG. 4 to FIG. 8.

(Eyelid Closure/Eyelid Opening Detection Unit)

The eyelid closure/eyelid opening detection unit 21c detects opening and closure of the eyelid that is in contact with the lens unit 10 and outputs a detection result to the image pickup control unit 21a or the recording control unit 21b. Opening and closure of the eyelid may be detected on the basis of an analysis result of captured images captured by the image pickup unit 24 or may be detected on the basis of a sensing result from the sensor 27. For example, the eyelid closure/eyelid opening detection unit 21c detects opening and closure of the eyelid in accordance with output from the piezoelectric sensor (example of sensor 27) provided in the lens unit 10. At the time of opening or closing the eyelid, the eyelid is brought into contact with the lens unit 10 and a pressure is generated. Therefore, in the case where a value exceeding a threshold is detected by the piezoelectric sensor, the eyelid closure/eyelid opening detection unit 21c can detect closure of the eyelid. The eyelid closure/eyelid opening detection unit 21c can also detect eyelid closure/eyelid opening on the basis of a value of an ocular potential.

The eyelid closure/eyelid opening detection unit 21c may detect that the eyelid is closed/opened not only in the case where the eyelid is completely closed/opened but also in the case where the eyelid is being closed/opened.

The eyelid closure/eyelid opening detection unit 21c can detect conscious eyelid closure (predetermined eyelid closure). The conscious eyelid closure is different from usual blinking and is operation in which the user consciously closes his/her eyelid in the case where the user gives a command for the contact lens 1. For example, the eyelid closure/eyelid opening detection unit 21c detects conscious eyelid closure on the basis of at least one of a time period, the number of times, and a pattern of eyelid closure. In the case where conscious eyelid closure is detected, the eyelid closure/eyelid opening detection unit 21c outputs a detection result thereof to the image pickup control unit 21a or the recording control unit 21b.

(Display Control Unit)

The display control unit 21d performs control so that an image is displayed on the display unit 26. The display control unit 21d according to this embodiment can display captured images recorded in the storage unit 25. Herein, in the case where the captured images recorded in the storage unit 25 are played back and there is a captured image associated with eyelid closure information indicating that the eyelid is closed at the time of capturing the image, the display control unit 21d performs control so that the captured image associated with the eyelid closure information is deleted (trimmed) and the other captured images are played back.

The display control unit 21d may control a display direction of a captured image to be displayed on the display unit 26 in accordance with a sensing result (tilt information of lens unit 10) from the gyro sensor (example of sensor 27). Further, in the case where tilt information indicating a tilt of the lens unit 10 occurring at the time of capturing an image is associated with the captured image, the display control unit 21d can also control a display direction of the captured image to be displayed on the display unit 26 in accordance with the tilt information.

Such specific display control performed by the display control unit 21d will be described below with reference to FIG. 7 to FIG. 8.

2. OPERATION PROCESSING

In the above description, the functional configuration of the contact lens 1 according to this embodiment according to this embodiment has been described in detail. Next, operation processing of the contact lens 1 according to this embodiment will be specifically described with reference to FIG. 4 to FIG. 8.

<2-1. First Image Pickup Control>

Figure 4:
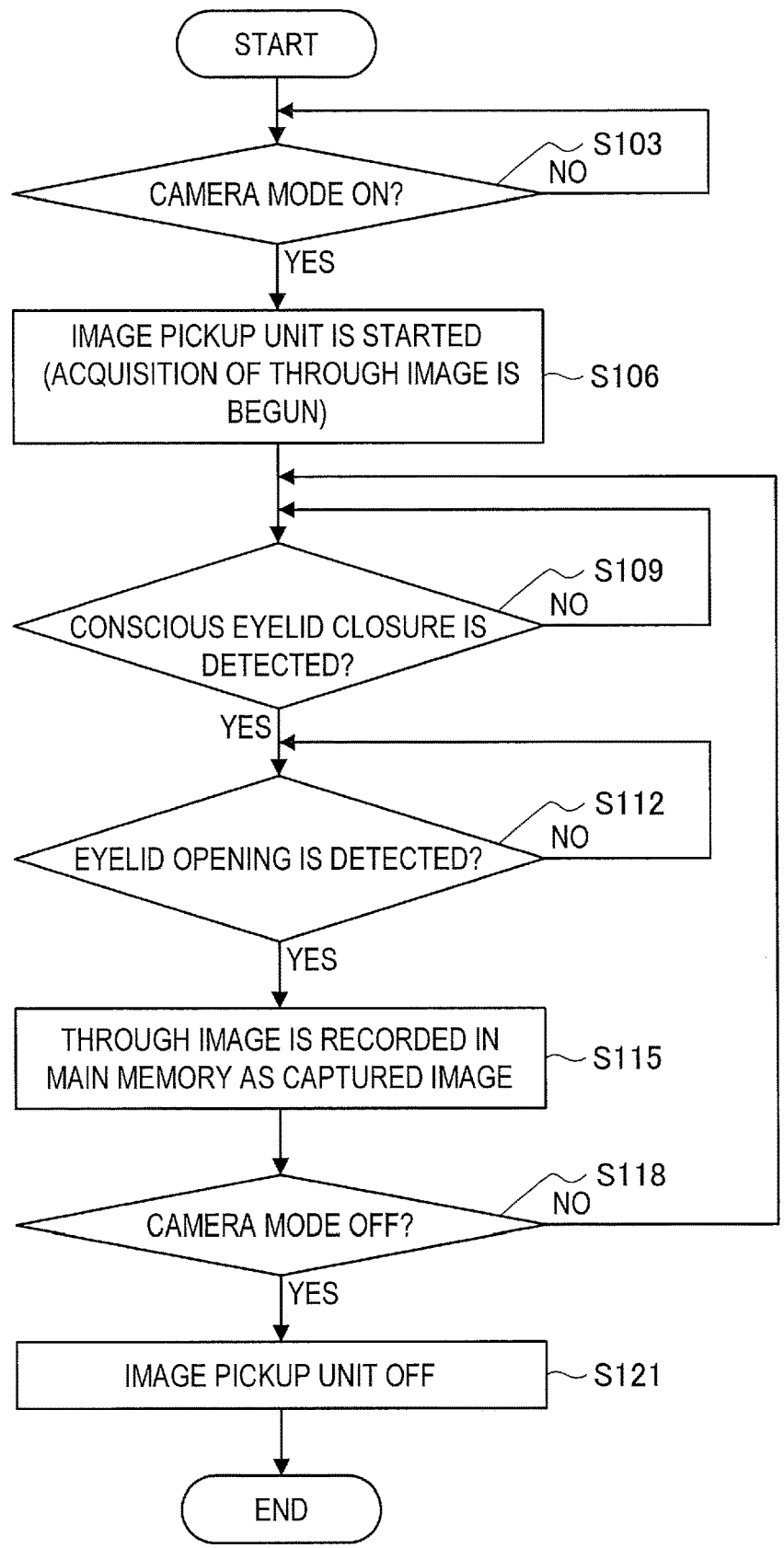
FIG. 4 is a flowchart showing processing of first image pickup control according to this embodiment.

FIG. 4 is a flowchart showing processing of first image pickup control according to this embodiment. As shown in FIG. 4, first, in Step S103, the main control unit 21 of the contact lens 1 determines whether or not a camera mode is on. Specifically, in the case where, for example, a power supply is on (in the case where electric power is supplied), in the case where the camera mode is set in advance, in the case where a predetermined switch is turned on, or in the case where a trigger signal is received from the outside, the main control unit 21 determines that the camera mode is on.

The predetermined switch is, for example, the piezoelectric sensor (example of sensor 27) provided in the lens unit 10 of the contact lens 1, and, in the case where the user presses an end of his/her eyelid in a state in which the eyelid is closed, such press is sensed by the piezoelectric sensor, and thus the switch can be turned on.

The trigger signal from the outside is a signal received from an external device via the antenna 23, and, in the case where, for example, the user operates a smartphone (example of external device) to turn on the camera mode, a trigger signal is transmitted to the contact lens 1 from the smartphone.

Then, in the case where the camera mode is on (S103/Yes), in Step 106, the image pickup control unit 21a starts the image pickup unit 24 and begins to acquire a continuous through image.

Then, in Step S109, the eyelid closure/eyelid opening detection unit 21c detects conscious eyelid closure of the eyelid that is in contact with the contact lens 1. Eyelid closure is detected on the basis of the through image acquired in S306, the piezoelectric sensor, a light sensor (example of sensor 27), or the like, and conscious eyelid closure is detected on the basis of at least one of a time period, the number of times, and a pattern of eyelid closure. For example, the eyelid closure/eyelid opening detection unit 21c measures a time period in which the eyelid is closed, and, in the case where the time period exceeds 0.5 second, the eyelid closure/eyelid opening detection unit 21c may detect the eyelid closure as conscious eyelid closure. It is known that a time period of usual blinking is generally 0.2 seconds to 0.4 seconds, and therefore it can be said that, in the case where the time period of blinking exceeds 0.5 seconds, the blinking is conscious blinking that is different from usual blinking (unconscious blinking).

Then, in Step S112, the eyelid closure/eyelid opening detection unit 21c detects eyelid opening.

Then, in the case where eyelid opening is detected (S112/Yes), in Step S115, the recording control unit 21b performs control so that the through image, which has been acquired by the image pickup unit 24 while the eyelid has been open, is recorded as captured images in the main memory area of the storage unit 25. In this case, the recording control unit 21b may record the through image in the main memory via a frame buffer.

Then, in Step 118, Steps S109 to S115 are repeated until the camera mode is turned off. A trigger signal for turning off the camera mode may also be transmitted from an external device (e.g., a smartphone of the user) in the same way as the trigger signal for turning on the camera mode.

In the case where the camera mode is turned off (S118/Yes), in Step S121, the image pickup control unit 21a turns off (terminates) the image pickup unit 24 to cause the image pickup unit 24 to terminate acquisition of the continuous through image.

As described above, the contact lens 1 according to this embodiment can release a shutter, i.e., can control capturing and recording of an image by using conscious closure of the eyelid as a trigger. The user can take a photograph of a subject existing in a gaze direction only by closing his/her eyelid. This remarkably improves usability of the contact lens 1.

<2-2. Second Image Pickup Control>

In the first image pickup control described above, by using conscious closure of the eyelid as a trigger, capturing of an image and recording of the captured image are performed at a timing at which the closed eyelid is opened, but capturing/recording timings according to this embodiment are not limited to the above example. In the following description, second image pickup control, which is different from the first image pickup control in the capturing/recording timings, will be described with reference to FIG. 5.

Figure 5:
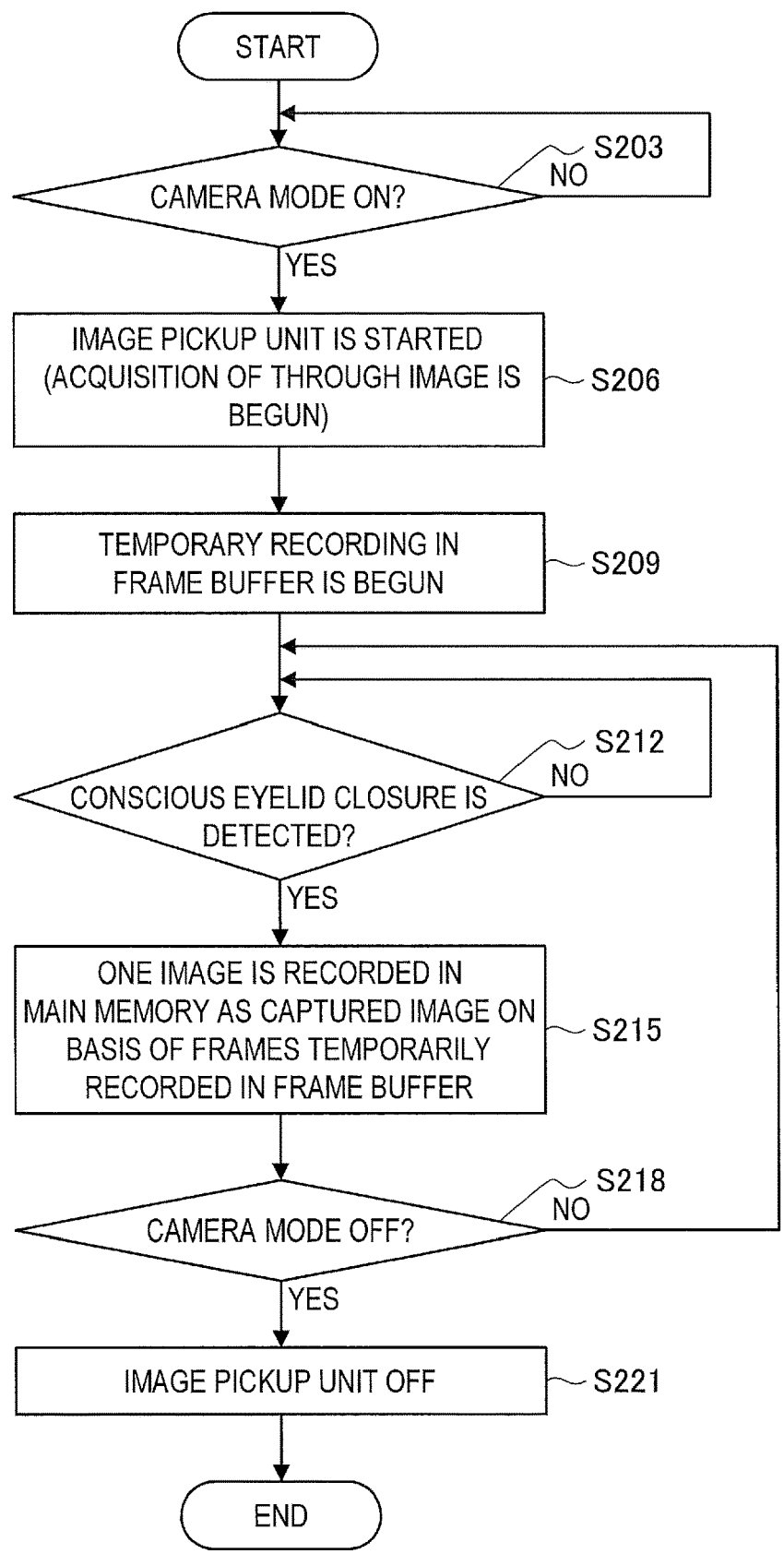
FIG. 5 is a flowchart showing processing of second image pickup control according to this embodiment.

FIG. 5 is a flowchart showing processing of the second image pickup control according to this embodiment. As shown in FIG. 5, first, in Step S203, the main control unit 21 of the contact lens 1 determines whether or not the camera mode is on in the same way as in S103.

Then, in the case where the camera mode is on (S203/Yes), in Step S206, the image pickup control unit 21a starts the image pickup unit 24 and begins to acquire a continuous through image.

Then, in Step S209, the recording control unit 21b begins control to temporarily record the through image captured by the image pickup unit 24 in a frame buffer area of the storage unit 25. Herein, the recording control unit 21b performs control so that the predetermined number of frames are circulatively recorded. The predetermined number only needs to be the number of frames which are set in consideration of an eyelid closure time period of the user, and is not particularly limited in this specification. For example, the predetermined number of frames may be set to three frames at most.

Then, in Step S212, the eyelid closure/eyelid opening detection unit 21c detects conscious eyelid closure of the eyelid that is in contact with the contact lens 1. Eyelid closure is detected on the basis of the piezoelectric sensor or the through image, and conscious eyelid closure is detected on the basis of at least one of a time period, the numbers of times, and a pattern of eyelid closure.

Then, in the case where conscious eyelid closure is detected (S212/Yes), in Step S215, the recording control unit 21b performs control so that one image is recorded as a captured image in the main memory of the storage unit 25 on the basis of the frames (through image) temporarily recorded in the frame buffer area of the storage unit 25. More specifically, the recording control unit 21b may select one frame from the predetermined number of frames that are circulatively and temporarily recorded in the frame buffer area and record the selected frame in the main memory or may generate one image (integrate the predetermined number of frames) on the basis of the predetermined number of frames and record the generated image in the main memory.

As a method of selecting one image from the predetermined number of frames, there is, for example, a method of preferentially selecting a frame (image) having less blur as a whole, a frame (image) having high contrast as a whole, or the like. In particular, in the case where a subject is dynamic, the method of selecting one frame is desirable.

As a method of generating one image on the basis of the predetermined number of frames, there is a method of generating one image on the basis of an average pixel value of the predetermined number of frames, a median value of the predetermined number of frames, or the like. In particular, in the case where a subject is static, the method of generating one image is desirable.

Then, in Step 218, Steps S212 to S215 are repeated until the camera mode is turned off. A trigger signal for turning off the camera mode may also be transmitted from an external device (e.g., a smartphone of the user) in the same way as the trigger signal for turning on the camera mode.

In the case where the camera mode is turned off (S218/Yes), in Step S221, the image pickup control unit 21a turns off (terminates) the image pickup unit 24 to cause the image pickup unit 24 to terminate acquisition of the continuous through image. The recording control unit 21b deletes a frame that is temporarily stored in the frame buffer.

As described above, in the second image pickup control according to this embodiment, it is possible to record a frame that is captured before eyelid closure. With this, it is possible to acquire a desired captured image more securely without missing a shutter timing.

<2-3. First Recording/Display Control>

In the above first and second image pickup control, processing in which a captured image captured before or after eyelid closure is recorded in the storage unit 25 has been described. The captured image recorded in the storage unit 25 may be a still image or a moving image (video). Herein, in the case of capturing a moving image, it is problematic in that, in the case where blinking is imaged, a screen becomes momentarily dark while the moving image is being played back.

In view of this, in first recording/display control according to this embodiment, eyelid closure information is recorded in association with a captured image and display control is performed in accordance with the eyelid closure information when the moving image is played back. With this, a momentarily dark screen is cut, and therefore a more comfortable video is played back. In the following description, the first recording/display control will be specifically described with reference to FIG. 6.

Figure 6:
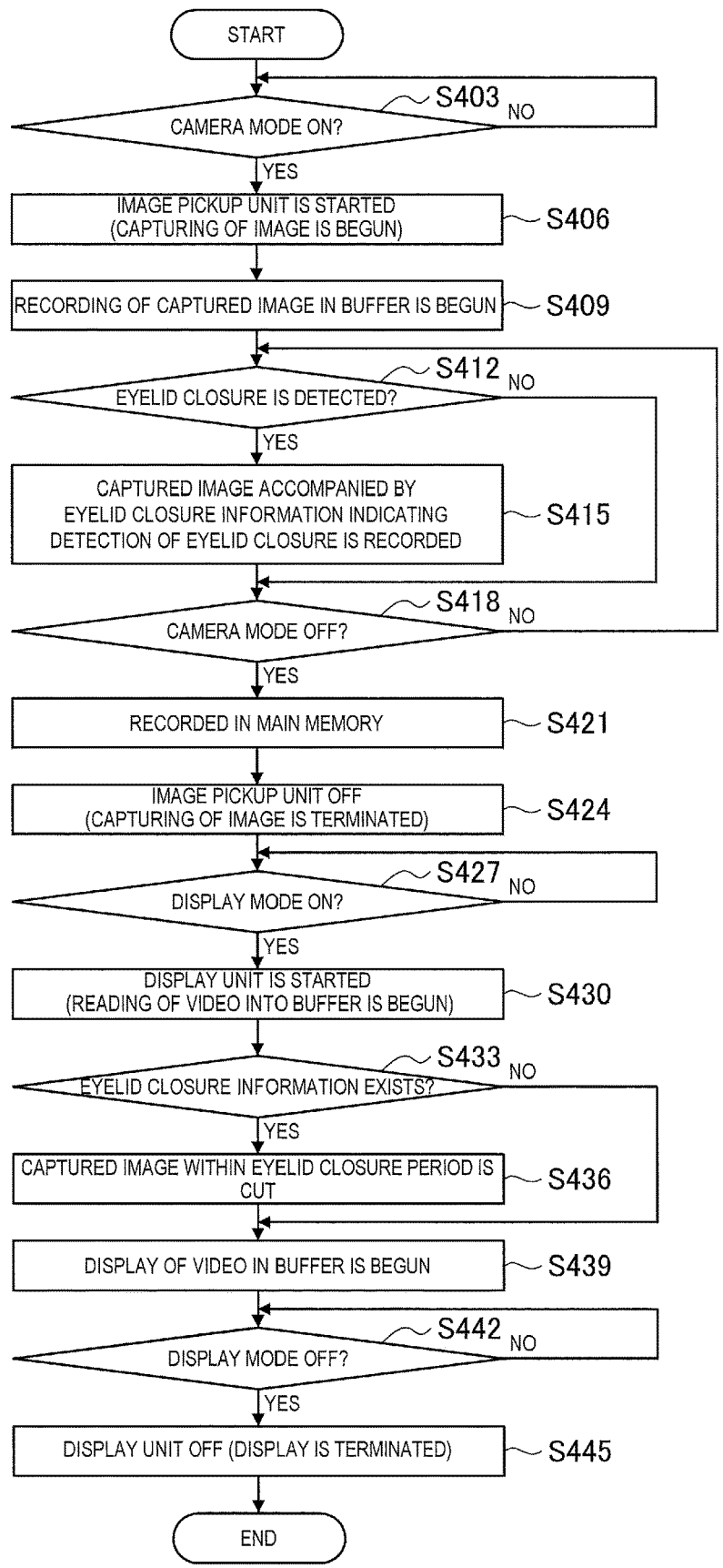
FIG. 6 is a flowchart showing processing of first image pickup/display control according to this embodiment.

FIG. 6 is a flowchart showing processing of the first image pickup/display control according to this embodiment. As shown in FIG. 6, first, in Step S403, the main control unit 21 of the contact lens 1 determines whether or not the camera mode is on.

Then, in the case where the camera mode is on (S403/Yes), in Step S406, the image pickup control unit 21a starts the image pickup unit 24 and begins to acquire consecutive captured images (video).

Then, in Step S409, the recording control unit 21b begins control to temporarily and successively record the captured images captured by the image pickup unit 24 in the buffer area of the storage unit 25.

Then, in Step S412, the eyelid closure/eyelid opening detection unit 21c detects eyelid closure of the eyelid that is in contact with the contact lens 1. Eyelid closure herein includes unconscious eyelid closure (usual blinking) and is detected on the basis of the captured images acquired in S409, the piezoelectric sensor, the light sensor (example of sensor 27), or the like. The eyelid closure/eyelid opening detection unit 21c outputs a detection result of eyelid closure to the recording control unit 21b.

Then, in the case where eyelid closure is detected (S412/Yes), in Step S415, the recording control unit 21b associates eyelid closure information indicating that eyelid closure has been detected with a captured image captured by the image pickup unit 24 and a time direction and records the eyelid closure information in the buffer area of the storage unit 25 (records the captured image accompanied by the eyelid closure information). On the contrary, in the case where eyelid closure is not detected (S412/No), accompanying of the eyelid closure information in S415 is not performed. Steps S412 to S415 are repeated until the camera mode is turned off in Step S418. Note that processing for acquiring captured images in Step S406 and processing for recording the captured images in the buffer area in Step S409 are continuously performed while Steps S412 to S415 are repeated.

Then, in the case where the camera mode is turned off (S418/Yes), in Step S421, the recording control unit 21b performs control so that the captured images recorded in the buffer area are recorded in the main memory area of the storage unit 25. Herein, the captured images recorded in the buffer area include a captured image that is accompanied by eyelid closure information and a captured image that is not accompanied by eyelid closure information because eyelid closure has not been detected.

Then, in Step S424, the image pickup control unit 21*a* turns off (terminates) the image pickup unit 24 to cause the image pickup unit 24 to terminate acquisition of the consecutive captured images.

Then, in the case where a display mode is turned on (S427/Yes), in Step S430, the display control unit 21*d* starts the display unit 26 and begins to read the captured images (video) recorded in the main memory of the storage unit 25 into the buffer area. A trigger signal for turning on the display mode may be transmitted from an external device (e.g., a smartphone possessed by the user), or, in the case where a predetermined switch, which is different from the camera mode ON/OFF, is turned on, a trigger signal for turning on the display mode may be detected. The predetermined switch, which is different from the camera mode ON/OFF, is operation input using a difference in the number of times or a pattern of pressing sensed by the piezoelectric sensor (example of sensor 27) provided in the lens unit 10. For example, the operation input is such that the user presses an end of the eyelid two times in a state in which the eyelid is closed.

Then, in Step S433, the display control unit 21*d* determines whether or not a frame (captured image) associated with eyelid closure information exists in frames of the captured images (video) that have been read into the buffer.

Then, in the case where there is a frame associated with eyelid closure information (S433/Yes), in Step S436, the display control unit 21*d* deletes the frame (captured image within eyelid closure period) associated with the eyelid closure information. Note that, in this case, the display control unit 21*d* may interpolate the deleted frame part with a frame generated on the basis of frames before/after the deleted frame or may interpolate the deleted frame by maintaining a previous frame.

On the contrary, in the case where there is no frame associated with eyelid closure information (S433/No), the display control unit 21*d* does not perform deletion processing and executes processing shown in Step S439.

Then, in Step S439, the display control unit 21*d* begins control to display the captured images (video) in the buffer on the display unit 26. Herein, because the frame associated with the eyelid closure information has already been deleted by the processing shown in S436, the display control unit 21*d* can play back the captured images in a state in which a screen that momentarily becomes dark due to blinking is removed (or in a state in which a deleted part is interpolated).

Then, in the case where the display mode is turned off (Step 442/Yes), the display control unit 21*d* turns off (terminates) the display unit 26 in Step S445.

<2-4. Second Recording/Display Control>

Processing for deleting a frame associated with eyelid closure information at the time of display is performed in the first recording/display control described above, but the contact lens 1 according to this embodiment may perform in advance processing in which, in the case of capturing images, a frame that momentarily becomes dark due to blinking is not captured (is not recorded). In the following description, such processing will be described as the second recording/display control with reference to FIG. 7.

Figure 7:
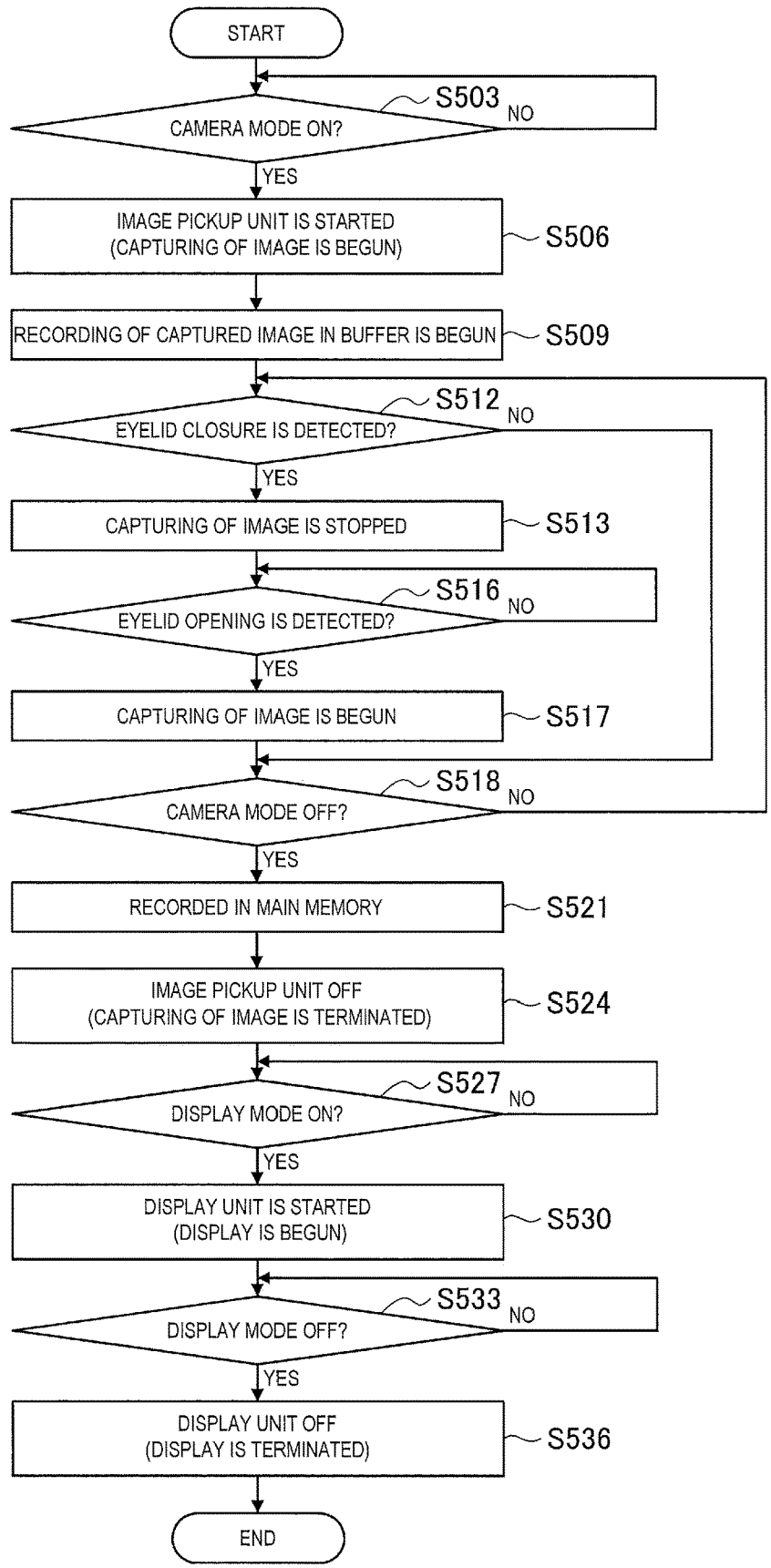
FIG. 7 is a flowchart showing processing of second image pickup/display control according to this embodiment.

FIG. 7 is a flowchart showing processing of the second image pickup/display control according to this embodiment. Processing in Steps S503 to S512 shown in FIG. 7 is similar to the processing in S403 to S412 shown in FIG. 6, and therefore description thereof is herein omitted.

Then, in the case where eyelid closure is detected (S512/Yes), in Step S513, the image pickup control unit 21*a* performs control so as to stop capturing of images using the image pickup unit 24.

Then, in the case where eyelid opening is detected (S516/Yes), in Step S517, the image pickup control unit 21*a* performs control so as to resume capturing of images using the image pickup unit 24. Thus, the image pickup control unit 21*a* temporarily stops capturing of images at a timing of eyelid closure, and therefore it is possible to prevent capturing of a momentarily dark image. Note that, in this case, in S512, the eyelid closure/eyelid opening detection unit 21*c* may detect beginning of closure of the eyelid as eyelid closure or may detect, as eyelid closure, a state in which the eyelid is completely closed. Image capturing stopping/beginning processing shown in S513 to S517 is not performed unless eyelid closure is detected (S512/No), and image capturing/recording processing shown in S509 is continued. Steps S512 to S517 are repeated until the camera mode is turned off in Step S518.

Then, in the case where the camera mode is turned off (Step 518/Yes), in Step S521, the recording control unit 21*b* performs control so that the captured images recorded in the buffer area are recorded in the main memory area of the storage unit 25.

Then, in Step S524, the image pickup control unit 21*a* turns off (terminates) the image pickup unit 24 to cause the image pickup unit 24 to terminate acquisition of the consecutive captured images.

Then, in the case where the display mode is turned on (S527/Yes), in Step S530, the display control unit 21*d* starts the display unit 26 and reads the captured images (video) recorded in the main memory of the storage unit 25 into the buffer area. Then, the display control unit 21*d* begins control to display the captured images (video) that have been read into the buffer on the display unit 26. Herein, in the case of capturing images, image pickup operation is temporarily stopped while the eyelid is closed by the processing shown in S512 to S517, and therefore the display control unit 21*d* can play back the captured images in a state in which a screen that momentarily becomes dark due to blinking is removed in advance.

Then, in the case where the display mode is turned off (Step 533/Yes), the display control unit 21*d* turns off (terminates) the display unit 26 in Step S536.

In the above description, there has been described in detail a case where the contact lens 1 performs in advance processing in which, in the case of capturing images, a frame that momentarily becomes dark due to blinking is not captured. Note that, in S512, in the case where a state in which the eyelid is completely closed is detected by the eyelid closure/eyelid opening detection unit 21*c* as eyelid closure, the contact lens 1 may cause the image pickup control unit 21*a* to stop capturing images and may delete the previous predetermined number of frames recorded in the buffer area by the recording control unit 21*b*. With this, it is possible to delete in advance captured images (frames) that are captured while the eyelid is being closed, i.e., before a state in which the eyelid is completely closed is detected as eyelid closure.

<2-5. Third Recording/Display Control>

In the examples described above, rotation of the contact lens 1 occurring at the time of capturing an image or displaying (playing back) the image has not been particularly mentioned. However, it is possible to prevent rotation of the contact lens 1 to some extent by, for example, forming the contact lens 1 so that a lower part thereof has a thickness larger than that of an upper part thereof. Alternatively, in the case of displaying (playing back) an image on the display unit 26 of the contact lens 1, the contact lens 1 according to this embodiment can also adjust a display direction of the displayed image in accordance with rotation (tilt) of the contact lens 1 occurring at the time of capturing the image or playing back the image. In the following description, processing for adjusting a display direction of a captured image in accordance with a tilt of the contact lens 1 occurring at the time of capturing the image will be specifically described with reference to FIG. 8 as third recording/display control.

Figure 8:
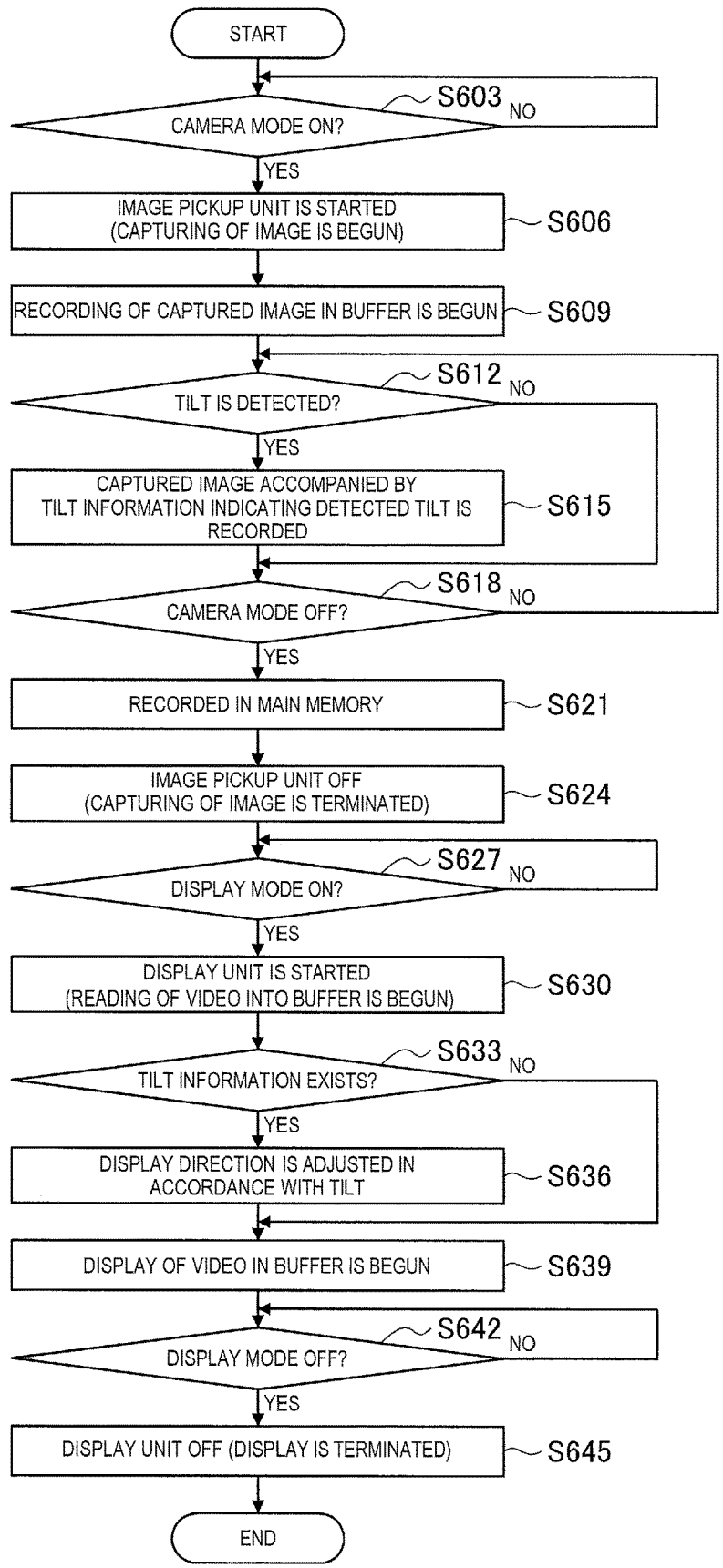
FIG. 8 is a flowchart showing processing of third image pickup/display control according to this embodiment.

FIG. 8 is a flowchart showing processing of the third image pickup/display control according to this embodiment. Processing in Steps S603 to S609 shown in FIG. 8 is performed in the same way as the processing in Steps S403 to S409 shown in FIG. 6.

Then, in Step S612, the gyro sensor (example of sensor 27) provided in the lens unit 10 detects tilt of the lens unit 10 and outputs a detection result (tilt information) to the recording control unit 21*b*.

Then, in the case where a tilt is detected (S612/Yes), in Step S615, the recording control unit 21*b* associates detected tilt information with a captured image captured by the image pickup unit 24 and a time direction and records the tilt information in the buffer area of the storage unit 25 (records the captured image accompanied by the tilt information). On the contrary, in the case where a tilt is not detected (S612/No), accompanying of the tilt information in S615 is not performed. Steps S612 to S615 are repeated until the camera mode is turned off in Step S618. Note that processing for acquiring captured images in Step S606 and processing for recording the captured images in the buffer area in Step S609 are continuously performed while Steps S612 to S615 are repeated.

Then, in the case where the camera mode is turned off (Step S618/Yes), in Step S621, the recording control unit 21*b* performs control so that the captured images recorded in the buffer area are recorded in the main memory area of the storage unit 25. Herein, the captured images recorded in the buffer area include a captured image that is accompanied by tilt information and a captured image that is not accompanied by tilt information because tilt has not been detected.

Then, in Step S624, the image pickup control unit 21*a* turns off (terminates) the image pickup unit 24 to cause the image pickup unit 24 to terminate acquisition of the consecutive captured images.

Then, in the case where the display mode is turned on (S627/Yes), in Step S630, the display control unit 21*d* starts the display unit 26 and begins to read the captured images (video) recorded in the main memory of the storage unit 25 into the buffer area.

Then, in Step S633, the display control unit 21*d* determines whether or not a frame (captured image) associated with tilt information exists in frames of the captured images (video) that have been read into the buffer.

Then, in the case where there is a frame associated with tilt information (S633/Yes), in Step S636, the display control unit 21*d* adjusts a display direction of the frame (captured image captured in a tilted state) in accordance with the associated tilt information. More specifically, the display control unit 21*d* rotates the frame in a normal direction in accordance with the tilt information.

On the contrary, in the case where there is no frame associated with tilt information (S633/No), the display control unit 21*d* does not adjust the display direction and executes processing shown in Step S639.

Then, in Step S639, the display control unit 21*d* begins control to display the captured images (video) in the buffer on the display unit 26. Herein, because the display direction of the frame associated with the tilt information has already been adjusted by the processing shown in S636, and therefore, even in the case where a captured image has been captured in a rotated state, the display control unit 21*d* can adjust the captured image in a normal direction and then display the captured image on the display unit 26.

Then, in the case where the display mode is turned off (Step 642/Yes), the display control unit 21*d* turns off (terminates) the display unit 26 in Step S645.

3. CONCLUSION

As described above, the contact lens 1 according to this embodiment has an image pickup function and can perform predetermined image pickup control in accordance with blinking or the like of the user. This makes it possible to make an intelligent contact lens, thereby remarkably improving usability for the user.

The contact lens 1 according to this embodiment can record a captured image before or after eyelid closure in the storage unit 25.

The contact lens 1 according to this embodiment can also record eyelid closure information or tilt information detected at the time of capturing images in association with the captured images (video) consecutively acquired in the image pickup unit 24 provided in the lens unit 10 in a time direction. With this, in the case where the acquired captured images are displayed, the contact lens 1 can delete a frame (captured image) that becomes momentarily dark due to eyelid closure or can adjust a display direction of a frame that is captured in a tilted state. This further improves usability of the contact lens 1 having an image pickup/display function.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, it is also possible to prepare a computer program for causing hardware, such as a CPU, a ROM, and a RAM included in the circuit unit 20 of the contact lens 1, to exert each function of the main control unit 21 of the contact lens 1 described above. Further, a computer readable storage medium storing the computer program is also provided.

Although the user normally wears a pair of contact lenses on his/her both eyes, the description has been made assuming that one contact lens 1 according to this embodiment is worn on one eye. In the case where a prescription lens for correcting visual sensation is the contact lens 1 having the image pickup function according to this embodiment, the user only needs to wear a usual prescription contact lens on the other eye. Further, by wearing the contact lenses 1 according to this embodiment on his/her both eyes, the user can simultaneously capture images of subjects existing in the respective gaze directions of right and left eyes with the use of the contact lenses 1.

Further, soft contact lenses and hard contact lenses having different properties of the lenses and different lens diameters are generally known as contact lenses, and the contact lens 1 according to this embodiment is applicable to either type thereof.

Additionally, the present technology may also be configured as below.

(1)

A contact lens including:

a lens unit configured to be worn on an eyeball;

an image pickup unit configured to capture an image of a subject, the image pickup unit being provided in the lens unit; and an image pickup control unit configured to control the image pickup unit.

(2)

The contact lens according to (1), further including:

a recording control unit configured to perform control in a manner that a captured image captured by the image pickup unit is recorded in a storage medium.

(3)

The contact lens according to (2), further including:

a transmission unit configured to transmit the captured image recorded in the storage medium to an external device.

(4)

The contact lens according to (2) or (3), wherein, in a case where predetermined eyelid closure of an eyelid that is in contact with the lens unit is detected, the recording control unit records the captured image captured by the image pickup unit in the storage medium.

(5)

The contact lens according to (4), wherein the recording control unit temporarily records, in the storage medium, previous predetermined number of frames captured by the image pickup unit and records one image on the basis of the predetermined number of frames that have been temporarily recorded, in accordance with detection of the predetermined eyelid closure.

(6)

The contact lens according to (4), wherein the recording control unit records the captured image captured by the image pickup unit in the storage medium at a timing at which next eyelid opening is detected, in accordance with detection of the predetermined eyelid closure.

(7)

The contact lens according to any one of (4) to (6), wherein the predetermined eyelid opening is conscious eyelid closure detected on the basis of at least one of a time period, the number of times, and a pattern of eyelid closure.

(8)

The contact lens according to (7), wherein the time period of the eyelid closure is sensed in accordance with output from a piezoelectric sensor provided in the lens unit.

(9)

The contact lens according to any one of (1) to (8), further including:

a sensor provided in the lens unit, wherein the image pickup control unit controls the image pickup unit in accordance with output from the sensor.

(10)

The contact lens according to (9), wherein the sensor is at least one of a piezoelectric sensor, an infrared sensor, and an acceleration sensor.

(11)

The contact lens according to any one of (1) to (10), further including:

a display unit provided in the lens unit.

(12)

The contact lens according to (11), wherein the recording control unit records, in a storage medium, a detection result of eyelid closure of an eyelid that is in contact with the lens unit in association with captured images consecutively captured by the image pickup unit in a time direction, and wherein the contact lens further includes a display control unit configured to perform control in a manner that the captured images are displayed on the display unit in accordance with the associated detection result of the eyelid closure.

(13)

The contact lens according to (12), further including:

a tilt sensor configured to sense a tilt of the lens unit, wherein the display control unit controls a display direction of the captured image to be displayed on the display unit in accordance with a tilt of the lens unit sensed by the tilt sensor.

(14)

A contact lens including, in a computer:

an image pickup unit configured to capture an image of a subject, the image pickup unit being provided in a lens unit configured to be worn on an eyeball; and an image pickup control unit configured to control the image pickup unit.

REFERENCE SIGNS LIST 1 contact lens
2 iris
3 pupil
10 lens unit
20 circuit unit
21 main control unit
21a image pickup control unit
21b recording control unit
21c eyelid closure/eyelid opening detection unit
21d display control unit
22 wireless communication processing unit
23 antenna
24 image pickup unit
24a image pickup lens
25 storage unit
26 display unit
27 sensor

The invention claimed is:

1. A contact lens, comprising:
a wearable lens unit wearable on an eyeball;
a display unit in a first region of the wearable lens unit, wherein the first region is in a center region of the wearable lens unit;
an image pickup unit in a second region of the wearable lens unit, wherein
the second region is between an outer circumference of the wearable lens unit and an outer circumference of the first region, and
the image pickup unit is configured to capture a plurality of images of a subject;

an image pickup control unit configured to control the image pickup unit;

a detection unit configured to:
  detect a first eyelid closure of an eyelid; and
  detect the eyelid is open subsequent to the detection of the first eyelid closure, wherein
    the eyelid is in contact with the wearable lens unit, and
    the detection unit is different from the image pickup unit;

a recording control unit configured to record a first captured image and a second captured image of the plurality of captured images, wherein
  the first captured image is recorded in association with a first detection result of the detection of the first eyelid closure, and
  the second captured image is recorded in association with a second detection result of the detection that the eyelid is open; and a display control unit configured to:
  delete the recorded first captured image based on the first detection result of the detection of the first eyelid closure; and
  control display of the recorded second captured image on the display unit based on the second detection result of the detection that the eyelid is open.

2. The contact lens according to claim 1, wherein the recording control unit is further configured to record the first captured image and the second captured image in a storage medium.

3. The contact lens according to claim 2, further comprising a transmission unit configured to transmit the second captured image recorded in the storage medium to an external device.

4. The contact lens according to claim 2, wherein
  the detection unit is further configured to detect a second eyelid closure of the eyelid; and
  the recording control unit is further configured to record a third captured image of the plurality of captured images in the storage medium based on the detection of the second eyelid closure of the eyelid.

5. The contact lens according to claim 4, wherein
  the recording control unit is further configured to:
    temporarily record the plurality of captured images in the storage medium; and
    record the third captured image, corresponding to the temporarily recorded plurality of captured images, based on the detection of the second eyelid closure.

6. The contact lens according to claim 4, wherein
  the recording control unit is further configured to record the third captured image in the storage medium based on the detection that the eyelid is open.

7. The contact lens according to claim 4, wherein the detection unit is further configured to detect that the second eyelid closure is a conscious eyelid closure based on at least one of a time period of the second eyelid closure, a number of times a user presses an end of the eyelid, or a pattern of the second eyelid closure.

8. The contact lens according to claim 7, wherein the detection unit is further configured to detect the time period of the second eyelid closure based on an output from a piezoelectric sensor in the wearable lens unit.

9. The contact lens according to claim 1, further comprising a sensor in the wearable lens unit, wherein the image pickup control unit is further configured to control the image pickup unit based on an output from the sensor.

10. The contact lens according to claim 9, wherein the sensor is at least one of a piezoelectric sensor, an infrared sensor, or an acceleration sensor.

11. The contact lens according to claim 1, wherein
  the image pickup unit is further configured to consecutively capture the plurality of images in a time direction,
  the recording control unit is further configured to record, in a storage medium, the first detection result of the detection of the first eyelid closure,
  the first detection result is recorded in association with a set of captured images of the plurality of captured images, and
  the display control unit is further configured to control display of the plurality of captured images on the display unit based on the first detection result of the detection of the first eyelid closure.

12. The contact lens according to claim 11, further comprising a tilt sensor configured to detect a tilt of the wearable lens unit, wherein
  the display control unit is further configured to control a display direction of at least one of the plurality of captured images displayed on the display unit, and
  the display direction of the at least one of the plurality of captured images is controlled based on the tilt of the wearable lens unit.

13. A non-transitory computer-readable medium having stored thereon computer-executable instructions which, when executed by a processor, cause the processor to execute operations, the operations comprising:
  capturing, by an image pickup unit, a plurality of images of a subject, wherein
    the image pickup unit is in a first region of a wearable lens unit,
    the first region is between an outer circumference of the wearable lens unit and an outer circumference of a second region of the wearable lens unit,
    the second region is in a center region of the wearable lens unit, and
    the second region includes a display unit;
  controlling the image pickup unit;
  detecting, by a detection unit, an eyelid closure of an eyelid;
  detecting, by the detection unit, the eyelid is open subsequent to the detection of the eyelid closure, wherein
    the eyelid is in contact with the wearable lens unit, and
    the detection unit is different from the image pickup unit;
  recording a first captured image and a second captured image of the plurality of captured images, wherein
    the first captured image is recorded in association with a first detection result of the detection of the eyelid closure, and
    the second captured image is recorded in association with a second detection result of the detection that the eyelid is open;
  deleting the recorded first captured image based on the first detection result of the detection of the eyelid closure; and
  controlling display of the recorded second captured image on the display unit based on the second detection result of the detection that the eyelid is open.

* * * * *